R. GRAVES.
HEATING DEVICE.
APPLICATION FILED MAR. 25, 1919.
1,324,502. Patented Dec. 9, 1919.
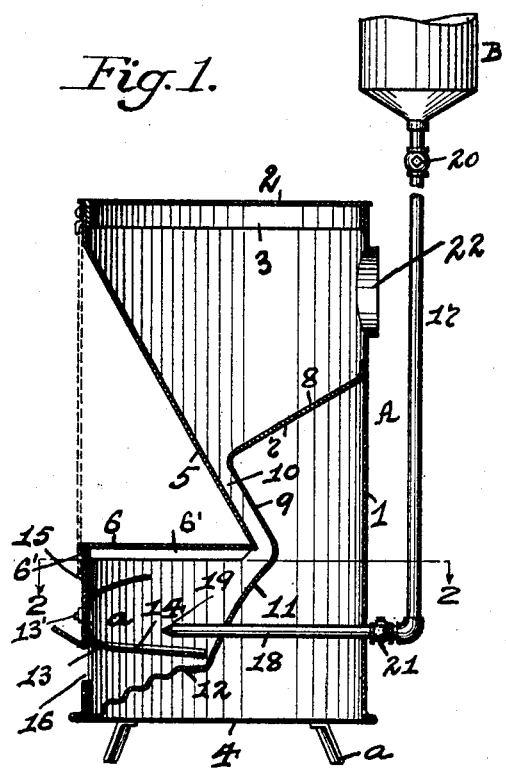
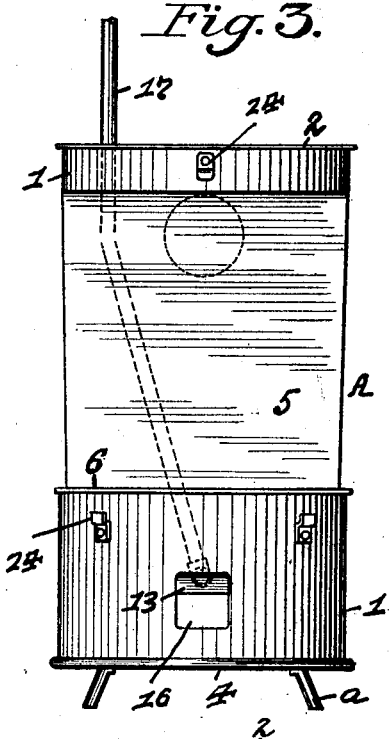
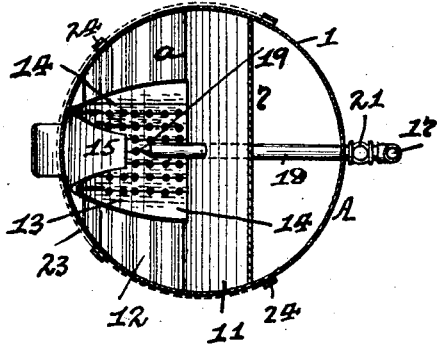
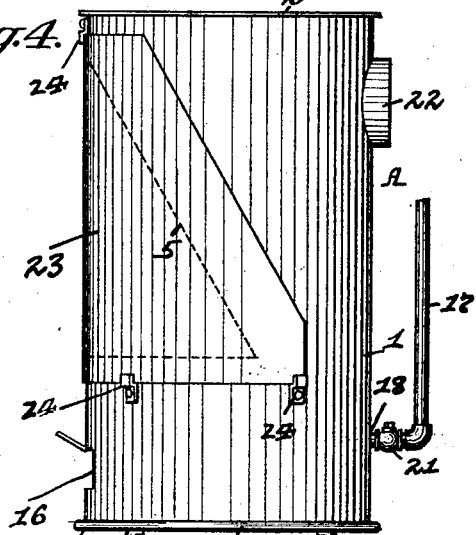
Witnesses:
J. M. Geoghegan.
Lois Wineman.
Inventor.
Randel Graves,
By J. N. Cooke,
Attorney.

UNITED STATES PATENT OFFICE.

RANDEL GRAVES, OF PITTSBURGH, PENNSYLVANIA, ASSIGNOR TO INDEPENDENT HEATING COMPANY, OF PITTSBURGH, PENNSYLVANIA, A CORPORATION OF DELAWARE.

HEATING DEVICE.

1,324,502.  Specification of Letters Patent.  Patented Dec. 9, 1919.

Application filed March 25, 1919. Serial No. 284,941.

*To all whom it may concern:*

Be it known that I, RANDEL GRAVES, a citizen of the United States, and a resident of Pittsburgh, in the county of Allegheny and State of Pennsylvania, have invented a new and useful Improvement in Heating Devices; and I do hereby declare the following to be a full, clear, and exact description thereof.

My invention relates to heating devices, and has special reference to such devices for use as stoves or heaters.

The object of my invention is to provide a cheap, simple and efficient form of heating appliance, which can be made from sheet metal easily and conveniently, will contain few parts to assemble, and will enable it to be used with liquid fuel, such as the ordinary coal or crude oil, if desired.

To these ends my invention consists, generally stated, in the novel arrangement, construction and combination of parts, as hereinafter more specifically set forth and described and particularly pointed out in the claims.

To enable others skilled in the art to which my invention appertains to construct and use my improved heating appliance, I will describe the same more fully, referring to the accompanying drawing, in which:

Figure 1 shows a vertical central section of my improved heating appliance for use as a stove;

Fig. 2 is a cross-section of the same on the line 2—2 Fig. 1, looking in the direction of the arrows;

Fig. 3 is a front view of the same; and

Fig. 4 is a view similar to Fig. 1 showing the appliance for use as a heater.

Like symbols of reference herein indicate like parts in each of the figures of the drawing.

As illustrated in the drawing A represents my improved heating stove appliance, which is formed from sheet metal, such as steel, and is circular in cross-section to form the body 1, removable top or cover 2 fitting within the upper end of said body by its flange 3, and the bottom 4 which is flanged to the lower end of said body and to which the supporting legs $a'$ are attached. The front portion of the body 1 is provided with the inwardly inclined deflecting plate 5, which extends down into said body from a short distance below the cover 2 and connects at its lower end with the horizontal supporting and deflecting plate 6. This plate 6 extends forward from said deflecting plate 5 to the front of the body 1 where it is removably held to said body by a flange 6' and acts as a support for the placing of pans or other devices for containing articles to be cooked by the appliance A. Within the body 1 of the appliance A is the inner deflecting plate 7, which is connected at its upper end to the rear surface of said body and is provided with the downwardly inclined portion 8 extending forwardly toward the front deflecting plate 5. A removably inclined portion 9 extends down from the inner or forward end of the inclined portion 8 on the inner deflecting plate 7 and parallels the plate 5 for forming an upwardly and removably inclined passageway 10 between said portion 9 and the plate 5. A forwardly inclined portion 11 on the deflecting plate 7 connects with the lower end of the inclined portion 9 on said plate adjacent the supporting plate 6 and such portion 11 is provided with a crimped portion 12 at its lower end which is adapted to be connected to the bottom 4. Removably connected to the front portion of the appliance A by a bolt 13' is the burner plate 13, which is provided with the perforated dished portion 14 extending at a slight downward incline to the lower end of the inclined portion 11 and with the inwardly curved portion 15 extending toward said portion 11. The inclined portion 14 is preferably corrugated longitudinally with the perforations 14' in the bottoms of such corrugations to permit the oil or other fuel to run back on to the said portion from the forward end of the same after being projected from the nozzle hereinafter described. An air and lighting opening 16 is formed in the front portion of the appliance A and below the inclined portion 14 on the burner plate 13, and a supply pipe 17 leads from a supply tank B, through the rear portion on the appliance by a horizontal portion 18. This portion 18 extends through the body 1 and the inclined portion 11 on the plate 7 into the burner chamber $a$ and over and along the inclined portion 14 of the burner plate 13, where it is provided with a pointed or nozzle end 19 for squirting the fuel onto the burner portion 14.

A suitable valve 20 is placed in the supply pipe 17 for controlling the supply of oil from the tank B to the burner portion 19 on said pipe, and a check valve 21 is placed in the supply pipe portion 18 for preventing any back pressure through said pipe and supply pipe 17 to the tank B.

The use and operation of my improved heating appliance A is as follows: The oil passes from the tank B through the pipe 17 to the horizontal portion 18 of the same and thence is ejected through the nozzle 19 against the curved portion 15 on the burner plate 13. After striking the curved portion 15 the fuel will be deflected down onto the inclined portion 14 of the burner plate 13 and will be ignited on said portion 14, so that the products of combustion therefrom will pass around the nozzle 19 and through the fuel chamber a against the supporting plate 6 where they are deflected into the passage-way 10. The products of combustion will also be deflected by the curved portion 15 on the plate 13 toward the inclined portion 11 on the plate 7, thence up the said passage-way 10 between the inclined portion 9 on the plate 7 and the plate 5 and thence deflected by the portion 8 out through the outlet 22 in the rear of the appliance, which outlet can be connected to a flue (not shown) by a suitable damper controlled pipe connection, if desired, and which connection can be provided with the usual damper for controlling the draft of the same.

In the starting of the heater A, or in case of a greater supply of the fuel being fed through the nozzle 19 from the tank B than is required, such extra amount of such fuel will pass through the perforated portion 14 of the burner plate 13 and onto the crimped portion 12 below said plate, where it will be ignited by the taper or match applied through the opening 16 and be consumed, so that the flame and products of combustion therefrom will pass up through said perforated portion or around the same into the burner chamber a and thence with the fuel on the portion 14 will pass up through the passage-way 10, as hereinbefore described. After the supply of the fuel has been so adjusted or regulated for the proper amount it will continue to be ignited and gasify on the inclined portion 14 of the burner plate 13, as hereinafter described.

If desired, the stove A can have the opening in front of the same covered or closed by the removable plate 23 which fits within the clips or flanged pieces 24 secured to the body 1 of the heater and which act to support said plate in place.

It will be obvious that the burner plate 13 can be removed by means of the bolt 13' and an ordinary grate (not shown) placed within the burner chamber a, in which case, the plate 6 being removable, coal or other fuel can be placed on such grate and within such chamber for use in heating the stove.

Various other modifications and changes in the design, construction and application of my improved heating device may be resorted to without departing from the spirit of the invention or sacrificing any of its advantages.

It will thus be seen that my improved heating device can be used as a stove or heater, or both, as desired, and that any kind of liquid or solid fuel can be used in the same, while its shape will permit of articles and food to be heated within and on top of the same, and being light in weight and compact in form it can be transported from place within a room or apartment conveniently and quickly for use. The device will give a great heating capacity by reason of the tortuous course of the products of combustion in passing through the device.

What I claim as my invention and desire to secure by Letters Patent is:

1. A heating device comprising a body having a burner chamber therein, an inclined deflecting plate extending inwardly and downwardly from the upper front portion of said body, a rear deflecting plate having an inwardly and downwardly extending portion paralleling said front plate for forming an upwardly and forwardly inclined passage-way from said burner chamber and between said plates for the passage of the products of combustion from said chamber, and a horizontal plate at the lower end of said front plate and supported on the front of said body for forming a deflecting portion over said burner chamber for the products of combustion to said passage-way.

2. A heating device comprising a body having a burner chamber therein, an inclined deflecting plate extending inwardly and downwardly from the upper front portion of said body, a rear deflecting plate having an inwardly and downwardly extending portion paralleling said front plate for forming an upwardly and forwardly inclined passage-way from said burner chamber and between said plates for the passage of the products of combustion from said chamber, and a removable horizontal plate at the lower end of said front plate and supported on the front of said body for forming a deflecting portion over said burner chamber for the products of combustion to said passage-way.

3. A heating device comprising a body having a burner chamber therein, an inclined deflecting plate extending inwardly and downwardly from the upper front portion of said body, a rear deflecting plate having a rearwardly and downwardly extending portion paralleling said front plate for forming an upwardly and forwardly inclined passage-way from said burner chamber and between said plates for the passage of the products of combustion from said chamber, a supply pipe extending into said burner chamber, and a burner plate in said chamber and under said pipe for receiving the fuel therefrom.

4. A heating device comprising a body having a burner chamber therein, an inclined deflecting plate extending inwardly and downwardly from the upper front portion of said body, a rear deflecting plate having a rearwardly and downwardly extending portion paralleling said front plate for forming an upwardly and forwardly inclined passage-way from said burner chamber and between said plates for the passage of the products of combustion from said chamber, a supply pipe extending into said burner chamber, and a burner plate in said chamber having a perforated portion under said pipe for receiving the fuel therefrom and an inwardly curved portion at the forward end of the same for deflecting the fuel from said supply pipe onto said perforated portion.

5. A heating device comprising a body having a burner chamber therein, an inclined deflecting plate extending inwardly and downwardly from the upper front portion of said body, a rear deflecting plate having a rearwardly and downwardly extending portion paralleling said front plate for forming an upwardly and forwardly inclined passage-way from said burner chamber and between said plates for the passage of the products of combustion from said chamber, a supply pipe extending into said burner chamber, a burner plate in said chamber having a perforated portion under said pipe for receiving the fuel therefrom and an inwardly curved portion at the forward end of the same for deflecting the fuel from said supply pipe onto said perforated portion, a supply pipe extending into said chamber, a perforated burner plate in said chamber and under said pipe for receiving the fuel therefrom, and a crimped portion under said burner plate extending downwardly and forwardly from the lower end of said last named downwardly and forwardly extending portion for receiving the surplus fuel from said pipe through said plate.

In testimony whereof, I, the said RANDEL GRAVES, have hereunto set my hand.

RANDEL GRAVES.

Witnesses:
J. M. GEOGHEGAN,
J. N. COOKE.